(12) United States Patent
Space et al.

(10) Patent No.: US 7,871,038 B2
(45) Date of Patent: Jan. 18, 2011

(54) SYSTEMS AND METHODS FOR PROVIDING AIRFLOW IN AN AEROSPACE VEHICLE

(75) Inventors: David R. Space, Everett, WA (US); Jane V. Matera, Seattle, WA (US); Warren A. Atkey, Bothell, WA (US); Charles J. Fiterman, Mukilteo, WA (US); John Gray, Shoreline, WA (US); Timothy J. Arnaud, Everett, WA (US)

(73) Assignee: The Boeing Company, Chicago, IL (US)

( * ) Notice: Subject to any disclaimer, the term of this patent is extended or adjusted under 35 U.S.C. 154(b) by 990 days.

(21) Appl. No.: 11/750,169

(22) Filed: May 17, 2007

(65) Prior Publication Data

US 2008/0283663 A1 Nov. 20, 2008

(51) Int. Cl.
*B64D 13/00* (2006.01)
(52) U.S. Cl. .......................... 244/118.5; 454/71; 454/76
(58) Field of Classification Search .............. 244/118.5; 454/71, 76, 72, 73, 74
See application file for complete search history.

(56) References Cited

U.S. PATENT DOCUMENTS

| | | | |
|---|---|---|---|
| 2,777,301 A | 1/1957 | Kuhn | |
| 2,960,825 A | 11/1960 | Sampietro | |
| 3,057,170 A | 10/1962 | Brahm | |
| 3,060,684 A | 10/1962 | Holmes | |
| 3,105,631 A | 10/1963 | Hahny | |
| 3,177,679 A | 4/1965 | Quick | |
| 3,194,026 A | 7/1965 | La Fluer | |
| 3,321,930 A | 5/1967 | La Fluer | |
| 3,683,749 A | 8/1972 | Bayles | |

(Continued)

FOREIGN PATENT DOCUMENTS

EP 0888966 A2 1/1999

(Continued)

OTHER PUBLICATIONS

"Aircraft Electric Secondary Power," Proceedings of a Conference held at NASA Lewis Research Center, Cleveland, Ohio, Sep. 14-17, 1982, NASA Conference Publication 2282, 50 pgs.

(Continued)

*Primary Examiner*—Christopher P Ellis
(74) *Attorney, Agent, or Firm*—Perkins Coie LLP

(57) ABSTRACT

Systems and methods for providing airflow in an aerospace vehicle are disclosed. A system in accordance with one embodiment includes an aerospace vehicle having an interior volume with a first portion and a second portion. The system can further include an external air supply device positioned to provide supply air to the interior volume at a variable supply flow rate and a recirculation fan configured to move air positioned within the interior volume between the first portion of the interior volume and the second portion of the interior volume. The system can still further include a controller operably coupled to the recirculation fan and configured to vary a rotation speed of the recirculation fan. Variations in the rotation speed of the recirculation fan can be associated with variations in a recirculation flow rate. In selected embodiments, the system can include sensors and/or data link devices operably coupled to the controller.

20 Claims, 2 Drawing Sheets

U.S. PATENT DOCUMENTS

| | | | |
|---|---|---|---|
| 4,091,613 A | 5/1978 | Young | |
| 4,312,191 A | 1/1982 | Biagini | |
| 4,419,926 A | 12/1983 | Cronin et al. | |
| 4,426,911 A | 1/1984 | Robinson | |
| 4,434,624 A | 3/1984 | Cronin et al. | |
| 4,462,561 A | 7/1984 | Cronin | |
| 4,494,372 A | 1/1985 | Cronin | |
| 4,503,666 A | 3/1985 | Christoff | |
| 4,514,976 A | 5/1985 | Christoff | |
| 4,523,517 A | 6/1985 | Cronin | |
| 4,533,097 A | 8/1985 | Aldrich | |
| 4,546,939 A | 10/1985 | Cronin | |
| 4,684,081 A | 8/1987 | Cronin | |
| 4,694,654 A | 9/1987 | Kawamura et al. | |
| 4,706,908 A | 11/1987 | Huffman et al. | |
| 4,742,760 A * | 5/1988 | Horstman et al. | 454/76 |
| 4,759,515 A | 7/1988 | Carl | |
| 4,762,294 A | 8/1988 | Carl | |
| 4,910,414 A | 3/1990 | Krebs | |
| 5,074,495 A | 12/1991 | Raymond | |
| 5,145,124 A * | 9/1992 | Brunskill et al. | 244/118.5 |
| 5,299,763 A | 4/1994 | Bescoby et al. | |
| 5,309,029 A | 5/1994 | Gregory et al. | |
| 5,323,603 A | 6/1994 | Malohn | |
| 5,490,645 A | 2/1996 | Woodhouse | |
| 5,535,601 A | 7/1996 | Teraoka | |
| 5,695,396 A * | 12/1997 | Markwart et al. | 454/76 |
| 5,709,103 A | 1/1998 | Williams | |
| 5,791,982 A * | 8/1998 | Curry et al. | 454/74 |
| 5,813,630 A | 9/1998 | Williams | |
| 5,899,085 A | 5/1999 | Williams | |
| 5,967,461 A * | 10/1999 | Farrington | 244/118.5 |
| 6,241,182 B1 | 6/2001 | Durandeau | |
| 6,491,254 B1 * | 12/2002 | Walkinshaw et al. | 244/118.5 |
| 6,526,775 B1 | 3/2003 | Asfia | |
| 6,681,592 B1 | 1/2004 | Lents et al. | |
| 6,704,625 B2 | 3/2004 | Albero et al. | |
| 6,755,375 B2 | 6/2004 | Trikha | |
| 6,928,832 B2 | 8/2005 | Lents et al. | |
| 7,121,100 B2 | 10/2006 | Atkey et al. | |
| 7,207,521 B2 | 4/2007 | Atkey et al. | |
| 7,210,653 B2 | 5/2007 | Atkey et al. | |
| 7,334,422 B2 | 2/2008 | Zywiak et al. | |
| 2002/0113167 A1 | 8/2002 | Albero | |
| 2004/0129835 A1 | 7/2004 | Atkey et al. | |
| 2005/0051668 A1* | 3/2005 | Atkey et al. | 244/118.5 |
| 2005/0178903 A1* | 8/2005 | Boorman et al. | 244/118.5 |
| 2006/0102790 A1 | 5/2006 | Atkey et al. | |
| 2006/0219842 A1* | 10/2006 | Shell et al. | 244/118.5 |
| 2007/0120014 A1* | 5/2007 | Elmers et al. | 244/118.5 |

FOREIGN PATENT DOCUMENTS

| | | |
|---|---|---|
| EP | 0 888 966 A2 | 7/1999 |

OTHER PUBLICATIONS

"All-Electric Aircraft, vol. I," presented at IEEE/AESS Symposium, Dayton, Ohio, Nov. 30, 1983, 90 pgs.

Air Force Research Laboratory/AFRL, Science and Technology for Tomorrow's Aerospace Forces, Success Story, F-16 Test Aircraft Completes Long Distinguished Career (2 pages) (Date Unknown. Subject of article may be material to this application).

Boeing Airline Magazine, Oct./Dec. 1994, p. 13, Figure 5.

Chang, M. et al., Preliminary (Issue #3) Power-by-Wire Development and Demonstration—Power Management and Distribution Requirements and Specifications; McDonnell Douglas Aerospace Transport Aircraft; Jun. 1995; 119 pgs.

Chang, M. et al.; Preliminary (Issue #1) Power-by-Wire Development and Demonstration—Electrical Power Center Module Requirements and Specifications; McDonnell Douglas Aerospace Transport Aircraft; Nov. 1994; 102 pgs.

Electrical Actuation for Aircraft Flight Control Surfaces, Dec. 2001 (2 pages; http://www.afrlhorizons.corn/Briefs/Dec01/PR0103.html [Accessed Aug. 1, 2003].

Electrically Powered Actuators, Aerospatiale Matra Airbus 2000 (1 page).

GE Develops a Starter/Generator with Pentek Boards, Written in the Summer of 1994, Updated: Summer 1996 (2 pages).

Goldberg, Joshua et al., "AAIA 98-DCHS, A Commercial Application of the electro-Expulsive Deicing System," 36th Aerospace Sciences Meeting & Exhibit, Jan. 12-15, 1998, Reno, Nevada, 8 pgs.

Groom, Nelson J. et al., "Electric Flight Systems," NASA Conference Publications 2202, Hampton, Virginia, Jun. 9-10, 1981, 272 pgs.

Holly, Harold C., "The Closed-Loop Air-Cycle Option for Equipment Cooling on Aircraft," SAE Technical Paper Series, The Engineering Resource for Advancing Mobility, Fourteenth Intersociety Conference on Environmental Systems, Jul. 16-19, 1984, San Diego, California, 9 pgs.

IEEE 1983 National Aerospace and Electronics Conference, NAECON 1983, pp. i-ii, 74-79.

Meeting Minutes from the NASA PBW Critical Design Review (CDR); McDonnell Douglas Aerospace Transport Aircraft; Jun. 10, 1996; 447 pgs.

Murray, W. E. et al., "Evlauation of All-Electric Secondary Power for Transport Aircraft," NASA Contractor Report 189077, Jan. 1992, 314 pgs.

Power-by-Wire Program; Oct. 19, 1993; NASA Lewis Planning Meeting: Cleveland, OH; 64 pgs.

Rosenbush, Fred M., "ECS Schemes for All Electric Airliners", SAE Technical Paper Series, The Engineering Resource for Advancing Movility, Twelfth Intersociety Conference on Environmental Systems, Jul. 19-21, 1982, San Diego, California, 14 pgs.

Tagge, G.E., et al., "Systems Study for an Integrated Digital/Electric Aircraft (IDEA)," NASA, 1985, 214 pgs.

Weimer, Joseph A., "21st Century Plane, Powering the United States Air Force," Presented at Indiana Energy Technology Sizzle, Purdue University, Nov. 11, 2004, 14 pgs.

Williams, Kenneth R., "Integrated Power Systems for Future Transport Aircraft," Transport Aircraft Division; McDonnell Douglas Aerospace; Jan. 3, 1997; 8 pgs.

Holly, Harold C., "The Closed-Loop Air-Cycle Option for Equipment Cooling on Aircraft," SAE Technical Paper Series, The Engineering Resourse for Advancing Mobility, Fourteenth Intersociety Conference on Environmental Systems, Jul. 16-19, 1984, San Diego, CA, 9 pgs.

U.S. Appl. No. 11/637,993, filed Dec. 13, 2006, Gray.

* cited by examiner

SYSTEMS AND METHODS FOR PROVIDING AIRFLOW IN AN AEROSPACE VEHICLE

TECHNICAL FIELD

The present disclosure is directed generally to systems and methods for providing airflow in an aerospace vehicle, for example, for varying the amount of air entering the interior of the vehicle and the amount of air being recirculated within the interior of the vehicle.

BACKGROUND

Traditionally, pressurized aircraft use Environmental Control Systems ("ECS") to maintain cabin pressurization and to control cabin temperatures during flight. In order to maintain cabin pressurization and temperature, outside air is supplied to the cabin via air conditioning packs and a portion of the air in the cabin is recirculated by recirculation fans to provide an acceptable level of volumetric airflow to the aircraft passengers. In many cases, recirculation fans run at a constant speed and the total volumetric airflow to the cabin is maintained constant by modulating the flow provided by the air conditioning packs. In some case, recirculated air is passed through a filter to improve cabin air quality. In other cases, aircraft carry cabin humidifiers and/or dehumidifiers to further condition cabin air.

As the amount of outside air provided by the packs increases, aircraft fuel efficiency is reduced. This is especially true when the air conditioning packs use bleed air from the aircraft engines. Accordingly, it can be desirable to reduce the amount of outside air flowing into the cabin via the air conditioning packs.

In some cases, aircraft manufacturers have designed aircraft to provide a selected amount of outside air to the cabin based on the number of cabin occupants. In this case, a crew member manually enters the number of passengers into a control panel connected to the ECS system. Accordingly, when the aircraft carries fewer passengers, the amount of outside air that enters the cabin can be reduced. In other cases, the ECS system is configured to provide a selected amount of outside air to the cabin based on the maximum number of passengers that can be carried by the aircraft. Additionally, in some cases the recirculation flow rate can also be adjusted using valves and/or flow restrictors to reduce the flow rate provided by the constant speed recirculation fans. As fuel cost increase, it can be important to provide good cabin air quality in a fuel efficient manner.

SUMMARY

The following summary is provided for the benefit of the reader only, and is not intended to limit in any way the invention as set forth by the claims. Aspects of the present disclosure are directed to systems and methods for providing airflow in an aerospace vehicle. An aerospace vehicle system in accordance with selected aspect includes an aerospace vehicle having an interior volume with a first portion and a second portion. The system can further include an external air supply device positioned to provide supply air to the interior volume at a variable supply flow rate and a recirculation fan configured to move air positioned within the interior volume between the first portion of the interior volume and the second portion of the interior volume. The system can still further include a controller operably coupled to the recirculation fan and configured to vary a rotation speed of the recirculation fan. Variations in the rotation speed of the recirculation fan can be associated with variations in a recirculation flow rate.

Other aspects of the disclosure are directed toward methods for providing airflow in an aerospace vehicle. One such method includes selecting a recirculation flow rate for moving air positioned within the interior volume of the aerospace vehicle between a first portion of an interior volume and a second portion of the interior volume. The method can still further include determining a rotation speed of a variable speed recirculation fan that will provide at least approximately the selected recirculation flow rate and rotating the recirculation fan at least approximately at the rotation speed.

Still other aspects of the disclosure are directed toward an aerospace vehicle system that includes an aerospace vehicle having an interior volume and a sensor configured to sense a characteristic of a contaminant in the interior volume. The system can further include a data link device operably coupled to the sensor. The data link device can be configured to transmit information about the characteristic of the contaminant to a remote data link station.

Yet other aspects of the disclosure are directed toward an aerospace vehicle system that includes an aerospace vehicle having an interior volume and an external air supply device positioned to provide supply air to the interior volume at a variable supply flow rate. The system can further include a controller operably coupled to the external air supply device and programmed with instructions for determining a selected supply flow rate based at least in part on a number of vehicle occupants. The system can still further include a data link device operably coupled to the controller and configured to receive a value corresponding to the number of vehicle occupants from a remote data link station via a data link signal. The data link device can be further configured to provide a signal representing the number of vehicle occupants to the controller.

DETAILED DESCRIPTION

The present disclosure describes systems and methods for providing airflow in an aerospace vehicle. Certain specific details are set forth in the following description and in FIGS. 1-2 to provide a thorough understanding of various embodiments of the invention. Well-known structures, systems, and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Several embodiments and/or portions of embodiments of the invention described below may take the form of computer-executable instructions, including routines executed by a programmable computer or computing system. Those skilled in the relevant art will appreciate that the invention can be practiced on digital or analog systems other than those shown and described below. The invention can be embodied in a special-purpose computer or data processor that is specifically programmed, configured or constructed to perform one or more of the computer-executable instructions described below. Accordingly, the term "computer" as generally used herein refers to any suitable data processor, including processors used for existing aircraft, programmed to carry out some or all of the instructions and/or processes described below. Additionally, in selected embodiments a computing system can include a distributed computing system wherein various portions of the computer-executable instructions are carried out by computer components that are operably coupled together (e.g., via wired or wireless interfaces).

Figure 1:
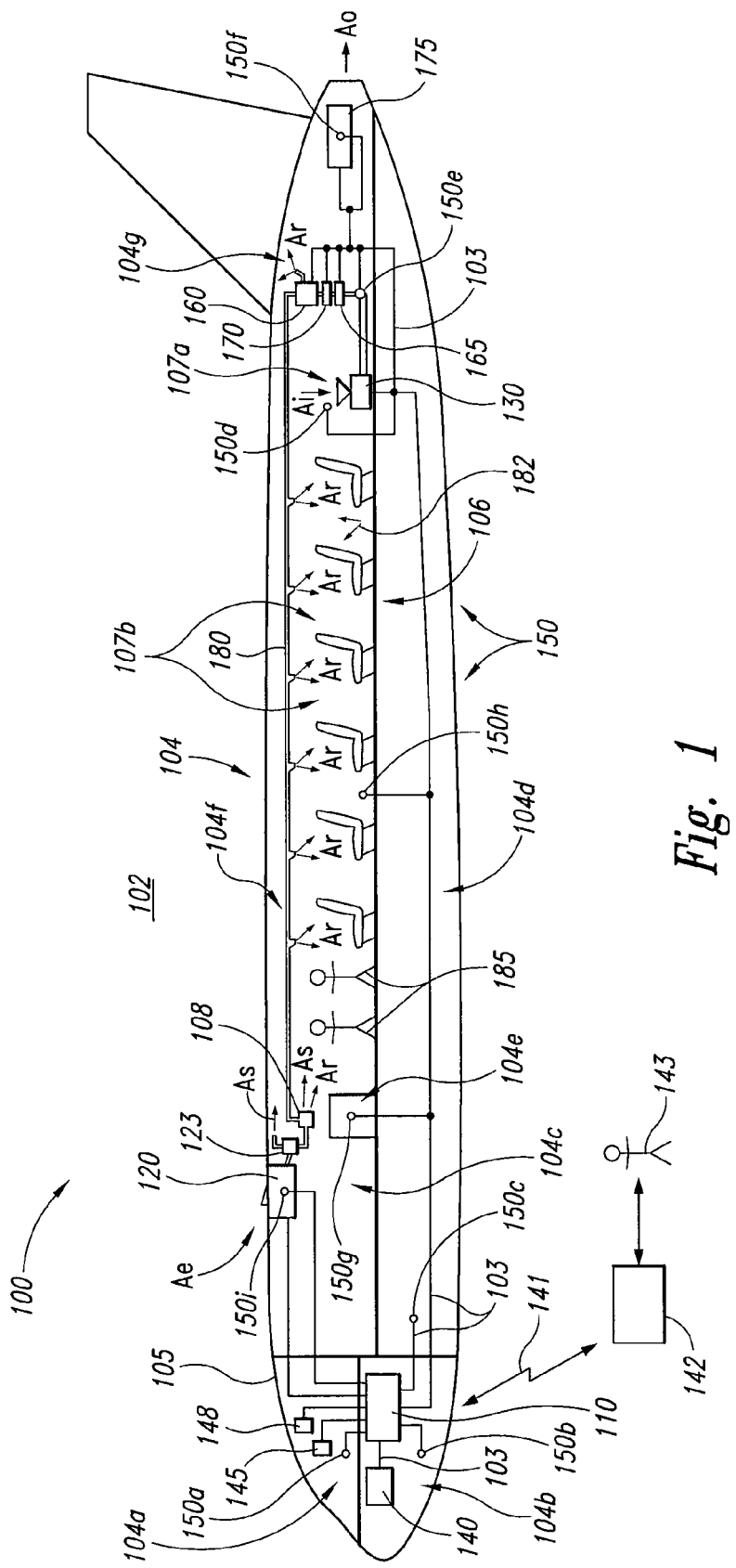
FIG. 1 is a partially schematic side elevation of an aerospace vehicle system in accordance with selected embodiments of the invention.

FIG. 1 is a schematic illustration of an aerospace vehicle system 100 with an external air supply device 120 and a recirculation device 130 in accordance with selected embodiments of the invention. In FIG. 1, the aerospace vehicle system 100 includes an aerospace vehicle 105 with an interior volume 106. The external air supply device 120 can be positioned to receive external air $A_e$ from exterior 102 of the vehicle and to provide at least a portion of the external air $A_e$ to the interior volume 106 as supply air $A_s$. The external air supply device 120 can provide the supply air $A_s$ to the interior 106 at a variable supply flow rate (e.g., a variable volume flow rate or mass flow rate). The aerospace vehicle system 100 can also include a recirculation device 130 configured to move air positioned within the interior volume 106 between a first portion 107a of the interior volume 106 and a second portion 107b of the interior volume 106. The recirculation device can be configured to provide a variable recirculation flow rate (e.g., a variable volume flow rate or mass flow rate). In selected embodiments, the external air supply device 120 and the recirculation device 130 can define at least a portion of an aerospace vehicle environmental control system (ECS).

The aerospace vehicle system 100 can also include a controller 110 operably coupled to the recirculation device 130 and the external air supply device 120. In selected embodiments, the controller can provide signals to the external air supply device 120 and the recirculation device 130 to provide selected supply flow rate(s) and selected recirculation flow rate(s) to meet various airflow requirements at various location(s) 104 inside the aerospace vehicle 105. For example, in certain embodiments the controller can control the supply flow rate and the recirculation flow rate to meet selected Federal Aviation Regulation (FAR) requirements, to meet cooling requirements, to meet occupant comfort requirements, to meet smoke and fume suppression requirements, and/or to minimize occupant exposure to various contaminants. Additionally, in selected embodiments the controller can control the supply flow rates and the recirculation flow rates to meet selected airflow requirements in a manner that allows fuel efficient operation of the aerospace vehicle.

In FIG. 1, external air $A_e$ from the exterior 102 of the vehicle enters the external air supply device 120. The external air supply device 120 then provides at least a portion of the external air $A_e$ to the interior 106 of the vehicle 105 as supply air $A_s$. In selected embodiments, the external air supply device 120 can include an air-conditioning pack with a pressurizing apparatus that compresses external air $A_e$ and provides at least a portion of the compressed external air to the interior 106 of the vehicle 105 as supply air $A_s$. In selected embodiments, at least a portion of the external air $A_e$ can include engine bleed air (e.g., air extracted from a compressor section of a turbine engine associated with, or carried by, the vehicle 105).

In selected embodiments, the external air supply device 120 can include a temperature control device for controlling the temperature of the supply air $A_s$ provided to the interior 106 of the vehicle 105. For example, in selected embodiments the external air supply device 120 can include a heat exchanger, a turbine, and/or a mixing chamber for mixing engine bleed air with ambient air from the exterior 102 of the vehicle 105. Additionally, in certain embodiments the external air supply device 120 can include a filtration device that includes one or more filtration elements for filtering contaminants (e.g., gaseous and/or particulate contaminants) from at least a portion of the air passing through the external air supply device 120.

In the illustrated embodiment, the external air supply device 120 also includes a moisture control device 123, which can add moisture to at least a portion of air passing though or proximate to the external air supply device 120, remove moisture from at least a portion of air passing though or proximate to the external air supply device 120, direct dry air to selected location(s) 104 of the aircraft interior 106, and/or direct moist air to selected location(s) 104 of the interior 106. For example, in the illustrated embodiment the interior 106 includes a cockpit location 104a, an electronics bay location 104b, a cabin location 104c, a cargo location 104d, a selected use location 104e (e.g., a galley or lavatory), an overhead location 104f, and an aft tail cone location 104g.

In FIG. 1, the external air supply device 120 generally provides dry supply air $A_s$ and the moisture control device 123 of the external air supply device 120 is configured to direct a portion of the dry supply air $A_s$ into the overhead location 104f. In the illustrated embodiment, the overhead location 104f carries insulation materials that can absorb moisture. Accordingly, in selected embodiments the flow of dry supply air $A_s$ into that area can reduce the collection of moisture near the skin of the vehicle 105, thereby reducing condensation that can result in corrosion. In other embodiments, the moisture control device 123 can be separate from the external air supply device 120, but can be positioned to control the moisture in at least a portion of the supply air $A_s$ that is supplied to the interior of the vehicle 105 by the external air supply device 120.

As discussed above, in selected embodiments at least a portion of the external air $A_e$ can include bleed air from a turbine engine associated with the aerospace vehicle to provide pressurized supply air. In other embodiments, the external air supply device 120 can include air conditioning systems or packs similar to those discussed in U.S. patent application Ser. No. 6,526,775, entitled ELECTRIC AIR CONDITIONING SYSTEM FOR AN AIRCRAFT, dated Mar. 4, 2003; U.S. patent application Ser. No. 11/301,179, entitled ELECTRIC-BASED SECONDARY POWER SYSTEM ARCHITECTURES FOR AIRCRAFT, filed Dec. 12, 2005; and U.S. patent application Ser. No. 10/691,440, entitled ELECTRIC-BASED SECONDARY POWER SYSTEM ARCHITECTURES FOR AIRCRAFT, filed Oct. 21, 2003; each of which is fully incorporated herein by reference. In still other embodiments, the vehicle can include multiple external air supply devices 120, for example, to provide redundancy.

In the illustrated embodiment, the external air supply device 120 is in fluid communication with a mixing manifold 108 where a portion of the supply air $A_s$ is mixed with recirculated air $A_r$ that has been moved from a first portion 107a of the interior 106 by the recirculation device 130 (as discussed below in further detail). In certain embodiments, this feature can allow the aerospace vehicle system 100 to use a portion of the supply air $A_s$ to warm or cool a portion of the recirculated air Ar. In other embodiments, the aerospace vehicle system 100 can include other arrangements. For example, in other embodiments the aerospace vehicle system 100 does not include the mixing manifold 108 and the supply air $A_s$ and the recirculated air $A_r$ are mixed in the interior 106 of the vehicle 105 without use of a mixing manifold 108 (e.g., mixed in the cabin location 104c). As discussed above, in selected embodiments the external air supply device 120 can be configured to deliver supply air $A_r$ at varying supply flow rates, for example, based on selected operating conditions.

As discussed above, the aerospace vehicle system 100 shown in FIG. 1 also includes the recirculation device 130 positioned to move air from the first portion 107a of the interior 106 to a second portion 107b of the interior 106 at varying supply flow rates. For example, the recirculation device 130 can include variable speed recirculation fan wherein the rotation speed of the recirculation fan can be varied to provide selected supply flow rates (e.g., flow rates proportional to and/or otherwise associated with the rotation speed of the recirculation fan). As used herein, the term recirculation fan can include any recirculation device having a rotating air propulsive element, for example, a bladed fan, a propeller, an impeller, and/or the like.

In the illustrated embodiment, interior air $A_i$ located in the first portion 107a of the interior 106 enters (e.g., is drawn into) the recirculation device 130 and moved to at least one other portion of the interior 106 via one or more passageways 180. For example, in FIG. 1 the recirculation device 130 moves air from the first portion 107a of the interior 106 to the second portion 107b of the interior 106 and to the mixing manifold 108. In the illustrated embodiment, recirculated air $A_r$ exits the recirculation device 130 via the passageways 180 and passes through a filtration device 165, a temperature control device 170, and a moisture control device 160, and then is distributed throughout other portions of the vehicle and to other locations.

In selected embodiments the filtration device 165 can include one or more filtration elements for filtering contaminants (e.g., gaseous and/or particulate contaminants) from at least a portion of the air passing through the filtration device 165. For example, in selected embodiments the filtration device 165 can include a filtration element comprised of a High Efficiency Particulate Air ("HEPA") filter for filtering out or removing particulate contaminants such as dust, pollen, allergens, viruses, bacteria, fungi, lint, soot, and/or the like from the air passing through the filtration device 165. In other embodiments the filtration device 165 can include a filtration element comprised of a gaseous type filter (e.g., an impregnated charcoal filter and/or a titanium dioxide and ultraviolet light filter). For example, in certain embodiments gaseous filters can be configured to filter out or remove gaseous contaminants such as alcohols, aldehydes, aromatics, ketones, alkanes, alkenes, and/or the like from the air passing through the filtration device 165. Accordingly, in selected embodiments the air being moved from the first portion 107a of the interior 106 to the second portion 107b of the interior 106 by the recirculation device 130 can be filtered to provide enhanced air quality in the interior 106 of the vehicle 105. Filters suitable for certain embodiments can be obtained from the Donaldson Company, Inc. of Minneapolis, Minn.

In FIG. 1, the temperature control device 170 is configured to control the temperature of the air passing through and/or proximate to it (e.g., passing through or proximate to a heat exchanger). For example, in selected embodiments at least a portion of the air being moved from the first portion 107a of the interior 106 to the second portion 107b of the interior 106 by the recirculation device 130 can be heated or cooled to enhance the comfort of vehicle occupants 185 in the interior 106. In certain embodiments, the temperature control device 170 can include a heat exchanger, and/or a mixing chamber for mixing engine bleed air with air being moved from the first portion 107a to the second portion 107b by the recirculation device 130. In selected embodiments, the temperature control device 170 can include a cooling system similar to those described in U.S. Pat. No. 7,121,100, entitled HIGH EFFICIENCY AIRCRAFT CABIN AIR SUPPLY COOLING SYSTEMS, dated Oct. 17, 2006, which is fully incorporated herein by reference.

The moisture control device 160, shown in FIG. 1, can be positioned so that at least a portion of the air moved by the recirculation device 130 passes through or proximate to the moisture control device 160 (e.g. though a humidifier and/or proximate to a desiccant). The moisture control device 160 can be configured to remove moisture from the air that passes through the moisture control device, add moisture to the air that passes through the moisture control device, direct dry air to selected locations 104 of the interior, and/or direct moist air to selected locations 104 of the interior. For example, in selected embodiments the moisture control device 160 can include a humidifier, a dehumidifier, and/or a desiccant. In the illustrated embodiment, the moisture control device 160 dehumidifies a portion of the air passing through the moisture control device 160 and provides the dehumidified recirculated air $A_r$ to a portion of the aft tail cone location 104g to reduce condensation near the skin of the aircraft. The moisture control device 160 can allow other portions of air to pass through it without altering the moisture content of the air. In other embodiments, the moisture control device 160 can control the moisture level in portions of the air passing into the cabin location 104c (e.g., via personal airflow outlet(s) 182 and/or other types of airflow outlet(s)) and/or the mixing manifold 108 to provide a comfortable interior humidity and/or temperature level for vehicle occupants.

Although a single recirculation device 130 is shown in FIG. 1, in other embodiments the aerospace vehicle system 100 can include multiple recirculation devices 130. Additionally, in other embodiments the aerospace vehicle system 100 can include other arrangements including more or fewer moisture control devices 160, filtration devices 165, and/or temperature control devices 170. In still other embodiments, air being moved from the first portion 107a of the interior 106 to the second portion 107b of the interior 106 by the recirculation device 130 can pass through the moisture control device 160, the filtration device 165, and/or the temperature control device 170 prior to passing through the recirculation device 130. For example, the recirculation device 130 can provide a suction drawing air from the first portion 107a of the interior 106 through one or more passageways 180 and through the filtration device 165, the moisture control device 160, and/or the temperature control device 170 prior to passing through the recirculation device 130.

In FIG. 1, the external air supply device 120 and the recirculation device 130 are operably coupled to the controller 110 via signal pathways 103. The controller 110 can be distributed among multiple components and can include portions of a computer or computing system, mechanical devices, electromechanical devices, and/or the like. In selected embodiments, the controller can be programmed with instructions for determining required supply flow rate(s) and/or recirculation flow rate(s) based on operational conditions/considerations. The controller 110 can then command the external air supply device 120 and/or the recirculation device 130 to provide at least approximately the determined supply flow rate(s) and/or recirculation flow rate(s), respectively. Additionally, in selected embodiments the controller can vary the supply flow rate(s) and/or recirculation rate(s) as operational conditions change.

For example, in certain embodiments the controller 110 can also be operably coupled to outflow valve(s) 175 via a signal pathway 103 and can control the supply flow rate and the outflow valve(s) 175 to control pressurization as the aerospace vehicle climbs and descends. The outflow valve(s) 175 can be configured to control the release of exhaust air $A_o$ from the aerospace vehicle 105. The controller 110 can be configured to control the supply flow rate (e.g., the external air $A_e$ entering the interior 106 of the vehicle 105) and outflow valve(s) 175 to provide a selected pressure in the interior 106 and/or a selected pressure differential between the interior 106 and the exterior 102 of the vehicle 105.

In other embodiments, the controller 110 can vary the supply flow rate based on the number of vehicle occupants that are carried on the vehicle. For instance, governmental regulations may require a minimum external airflow rate per occupant to during flight (see e.g., FAR 25.831(a)). In still other embodiments, the supply flow rate can be varied to ensure adequate thermal control, adequate equipment cooling, adequate cargo exhaust, adequate lavatory exhaust, adequate galley exhaust, and/or adequate smoke suppression/evacuation in a smoke event. As discussed below in further detail, in selected embodiments the controller can use stored information, sensed information, information provided by an operator, and/or information supplied by a data link to determine flow rate requirements.

In FIG. 1, the controller 110 can vary the recirculation flow rate in response to variations in the supply flow rate and/or based on various operational conditions/considerations similar to those discussed above. For example, in selected embodiments the controller 110 can vary the recirculation flow rate as the supply flow rate is increased or decreased so that the total flow rate (e.g., volumetric or mass flow rate) at selected locations 104 (e.g., at the cabin location 104c) remains at least approximately constant. In certain embodiments where the recirculation device 130 includes a variable speed recirculation fan, the controller 110 can determine the rotation speed of the recirculation fan to provide at least approximately a desired recirculation flow rate and control/command the rotation speed of recirculation fan accordingly. In selected embodiments, this feature can allow a reduction in external air requirements, thereby increasing vehicle fuel economy while maintaining desirable cabin flow rates via the increase in recirculation flow rates. For example, in selected embodiments the controller 110 can reduce the supply flow rate and increase the recirculation flow rate during selected phases of flight and/or above selected altitudes to improve fuel economy.

In selected embodiments, the controller can receive information from various sources including an input device 145, a data link device 140, and/or one or more sensors 150 operably coupled to the controller 110 via signal pathways 103 (e.g., wired or wireless pathways). For example, the input device 145 can include a keypad or other type of input device that allows the vehicle occupant to enter a value representing the number of vehicle occupants carried, or anticipated to be carried by the vehicle 105. In other embodiments, the input device 145 can include other devices and/or systems. For example, in selected embodiments the input device can include a flight management system (e.g., to provide phase of flight information), an aircraft altimeter system, and/or a pressurization management control. In other embodiments, the input device 145 can be a maintenance loading device configured to load a value representing the number of vehicle occupants into the controller (e.g., the maximum of vehicle occupants for which the aircraft is configured).

In the illustrated embodiment, the data link device 140 is configured to communicate with a remote data link receiving station 142 via data link signal(s) 141 (e.g., via a wired or wireless connection). For example, the data link receiving station 142 can provide information to and/or receive information from a remote entity 143 (e.g., a computing system, a company dispatcher, or other type of operator). In selected embodiments, the data link device 140 can be configured to receive a signal representing a number of vehicle occupants carried by (or to be carried by) the vehicle 105, and to provide to the controller 110 a signal (e.g., an electromagnetic signal) representing the number of vehicle occupants (e.g., via signal pathways 103). For example, in certain embodiments the value corresponding to the number of vehicle occupants can be provided to the controller 110 via the data link device 140. Once the number is verified (e.g., accepted or acknowledged) by a vehicle occupant, the controller 110 can determine the required supply flow rates and/or the required recirculation rates for various phases of flight and the controller 110 can command the flow rate(s) at the appropriate time. As discussed in further detail below, in certain embodiments the data link device 140 can receive signals from the controller and/or transmit information to the remote data link receiving station 142 via data link signal(s) 141.

In FIG. 1, the sensors 150 are configured to sense various characteristics associated with air in the interior 106 of the aerospace vehicle 105. For example, the sensors can be configured to sense air pressure, airflow rates (e.g., volumetric flow rates and/or mass flow rates), air temperature, air humidity, and/or airborne contaminants (e.g., including particulate contaminants, gaseous contaminants, biological elements, and/or chemical elements). In the illustrated embodiment, the sensors 150 include a first sensor 150a proximate to the cockpit location 104a, a second sensor 150b proximate to the electronics bay location 104b, a third sensor 150c located proximate to the cargo location 104d, a fourth sensor 150d proximate to the first portion 107a of the interior 106, a fifth sensor 150e positioned to sense one or more characteristics of air passing through the passageway 103 proximate to the recirculation device 130, a sixth sensor 150f proximate to outflow valve(s) 175, a seventh sensor 150g proximate to the selected use location 104e, an eighth sensor 150h located proximate to the second portion 107b of the interior 106, and the ninth sensor 150i located proximate to the external air supply device 120. In other embodiments, sensors can be located to sense characteristics associated with the air exterior to the aerospace vehicle 105 (e.g., outside air temperature). In other embodiments, the aerospace vehicle system 100 can include more or fewer sensors 150.

In selected embodiments, the controller 110 can be configured to adjust the supply flow rate and/or the recirculation flow rate in response to one or more characteristics sensed by the sensors 150. For example, in selected embodiments the controller 110 can increase the supply flow rate (e.g., and the external air $A_e$ entering the interior 106 of the vehicle 105) if the sensor(s) 150 detect that a selected concentration of a selected contaminant (e.g., CO and/or $CO_2$) has been met or exceeded in order to reduce the concentration of the contaminant in the interior 106 of the vehicle 105. In other embodiments, the controller 110 can decrease the supply flow rate if excessive $O_3$ is sensed in the interior of the vehicle to decrease the concentration of $O_3$. In still other embodiments, the controller 110 can increase supply flow rates, increase the release of exhaust air $A_o$ through outflow valve(s) 175, and decrease or cease the flow of recirculated air $A_r$ in the event of certain smoke conditions to evacuate smoke from the interior 106 of the aerospace vehicle 105. In yet other embodiments, the controller can increase the supply flow rate to increase equipment cooling in the event that excessive temperatures are sensed in the electronics bay location 104b and/or on selected electronic components. In still other embodiments the controller can use the combination of supply flow rate and recirculation flow rate to aid in temperature control and/or pressurization control of the interior 106 of the vehicle 105.

In still other embodiments, the controller can adjust the supply flow rate, the recirculation flow rate, and/or outflow valve(s) 175 in response to the detection of a biological or chemical element (e.g., a gaseous or particulate contaminant) if sensor(s) 150 sense or detect that at least a selected amount of a biological or chemical element is present. For example, in selected embodiments upon the detection of a selected concentration of a hazardous contaminant the controller can increase the supply flow rate, decrease (or cease) the recirculation flow rate, and increase the release of exhaust air $A_o$ from the outflow valve. In certain instances, this can reduce the effect of the contaminant on vehicle occupants. In other embodiments, the controller can increase both the supply flow rate and the recirculation flow rate in response to certain types of contaminants such as microbials (e.g., increasing air movement in the interior, air movement through the interior, and/or airflow through any associated filtration device(s)). Additionally, in certain embodiments the controller can send signal(s) to an alerting device 148 (e.g., a cockpit annunciation system and/or display) regarding one or more characteristics associated with the contaminant. For example, in selected embodiments the alerting device 148 can include a cockpit annunciation system and can alert one or more vehicle occupants that the contaminant has been detected, the type of contaminant, and/or the concentration of the contaminant.

In other embodiments, the controller can determine what information regarding the one or more characteristics associated with the contaminant should be shared with other entities and can send signal(s) to the data link device 140 containing information regarding the one or more characteristics (e.g., either automatically or after receiving authorization from an aircraft occupant). The data link device 140 can then transmit the corresponding information to the remote data link receiving station 142 via a data link signal 141 (e.g., either automatically or after receiving authorization from an aircraft occupant). For example, in selected embodiments the information can include the type of contaminant that has been detected and/or the concentration of the contaminant. In certain embodiments, this feature can be useful in detecting selected hazardous biological and/or chemical contaminants and notifying a destination airport and/or other entitie(s) of the contamination, allowing the entitie(s) to plan appropriately (e.g., arrange quarantine facilities, medical assistance, and/or to divert the aerospace vehicle 105 to a facility suited to handle the contaminant).

Figure 2:
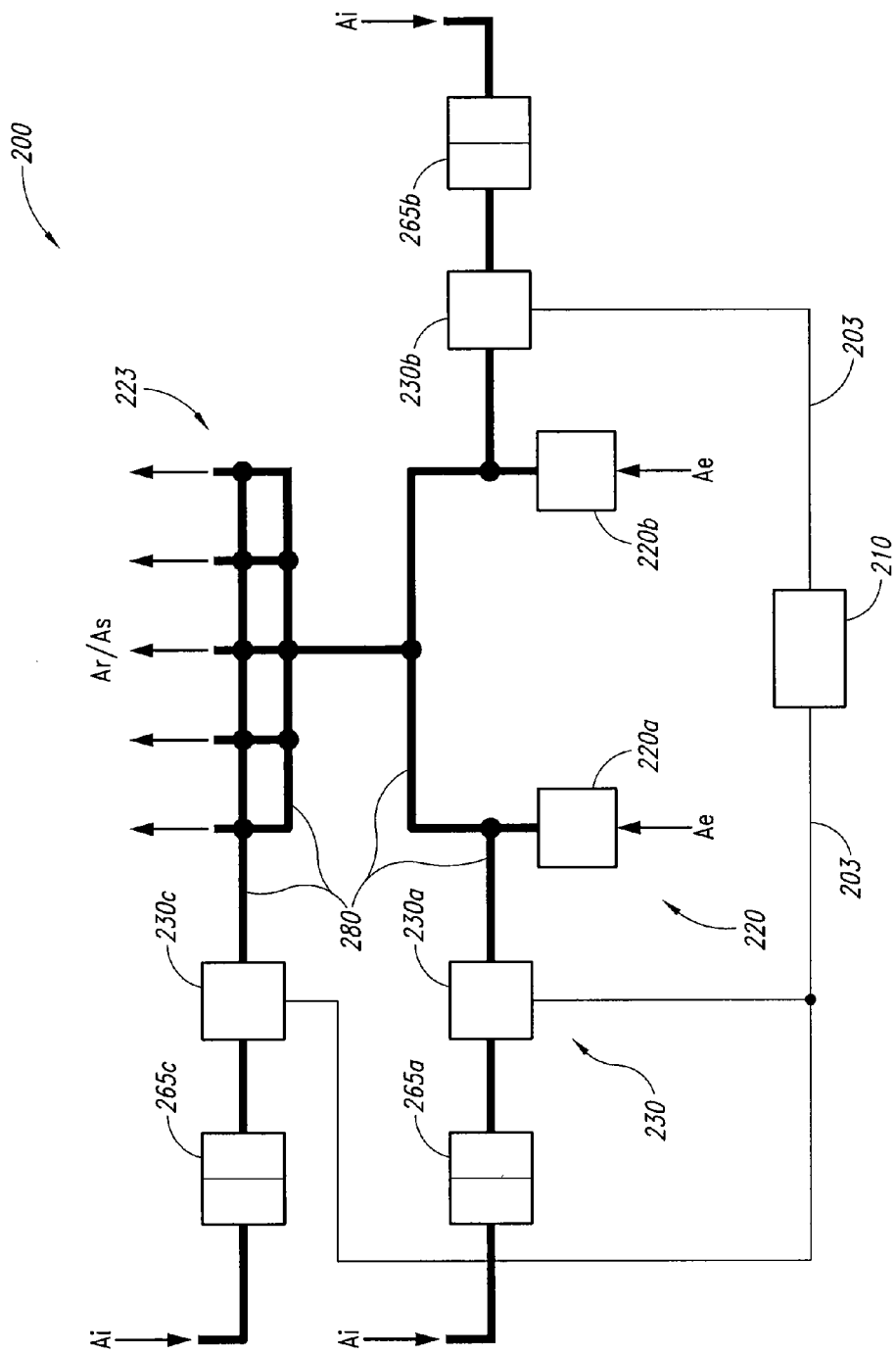
FIG. 2 is a partially schematic illustration of a portion of an aerospace vehicle system in accordance with other embodiments of the invention.

FIG. 2 is a partially schematic illustration of a portion of an aerospace vehicle system 200 in accordance with other embodiments of the invention. In FIG. 2, the aerospace vehicle system 200 includes a controller 210 operably coupled to two external air supply devices 220 via signal pathways 203. In the illustrated embodiment, the supply devices 220 include a first external air supply device 220a and a second external air supply device 220b. Additionally, the controller 210 is operably coupled to three recirculation devices 230 via signal pathways 203. In FIG. 2, the recirculation devices 230 include a first recirculation device 230a, a second recirculation device 230b, and a third recirculation device 230c.

In the illustrated embodiment, the first and second external air supply devices 220a, 220b receive external air $A_e$ and provide supply air $A_s$ to passageways 280. The first and second recirculation devices 230a, 230b receive interior air $A_i$ from one or more first portions of an interior volume of an aerospace vehicle. In FIG. 2, the interior air $A_i$ passes through first and second filtration devices 265a, 265b before entering the recirculation devices 230a, 230b, respectively. The first and second recirculation devices 230a, 230b provide recirculated air $A_r$ to the passageways 280 where it is mixed with supply air $A_s$ from the first and second external air supply devices 220a, 220b.

In FIG. 2, the supply air $A_s$ from the first and second external air supply devices 220a, 220b and the recirculated air $A_r$ from the first and second recirculation devices 230a, 230b flow into a mixing manifold 223 via passageways 280. The third recirculation device 230c receives internal air $A_i$ from one or more additional first portions of the interior volume of the aerospace vehicle via a third filtration device 265c and provides additional recirculated air $A_r$ to the mixing manifold 223. The recirculated air $A_r$ from the first, second, and third recirculation devices 230a, 230b, 230c and the supply air $A_s$ from the first and second external supply air devices 220a, 220b are then distributed to one or more second portions of the interior volume of the vehicle (e.g., via personal airflow outlet(s) and/or other types of airflow outlet(s)). The controller 210 can control the supply flow rate of supply air $A_s$ and/or the recirculation flow rate of recirculated air $A_r$ in a manner similar to that discussed above with reference to FIG. 1.

A feature of some of the embodiments discussed above is that the controller can control the supply flow rate and the recirculation flow rate based on operational conditions/considerations. An advantage of this feature is that an interior environment in the vehicle can be consistently comfortable. Another feature of some of the embodiments discussed above is that the controller can provide an acceptable interior environment while reducing the amount of external air entering the aerospace vehicle. An advantage of this feature is that the amount of external air entering the aerospace vehicle can be reduced, thereby improving fuel economy while maintaining an acceptable interior environment. Still another feature of some of the embodiments discussed above is that in some cases recirculated air contains more moisture than the external air entering the vehicle. Accordingly, increasing recirculation flow rates and reducing supply flow rates can aid in maintaining a desired level of humidity and/or a desired temperature inside the aerospace vehicle. An advantage of this feature is that in some case cabin humidifiers can be reduced in size and/or eliminated.

From the foregoing, it will be appreciated that specific embodiments of the invention have been described herein for purposes of illustration, but that various modifications may be made without deviating from the invention. Additionally, aspects of the invention described in the context of particular embodiments may be combined or eliminated in other embodiments. For example, although some of the embodiments discussed above included one or more filtration devices, temperature control devices, and moisture control devices, in other embodiments the vehicle system does not include any filtration devices, temperature control devices, or moisture control devices. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. An aerospace vehicle system, comprising:
   an aerospace vehicle having an interior volume with a first portion and a second portion;
   an external air supply device positioned to provide supply air to the interior volume at a variable supply flow rate;
   a recirculation device configured to move air positioned within the interior volume between the first portion of the interior volume and the second portion of the interior volume;

a gas contaminant filter positioned to remove gas contaminants from recirculated air provided to the interior volume; and a controller operably coupled to the recirculation device and the external air supply device, the controller being programmed with instructions to reduce external air entering the vehicle in response to an input to increase humidity in the interior volume and configured to vary a recirculation flow rate of the recirculation device.

2. The system of claim 1 wherein the controller is operably coupled to the recirculation device and the external air supply device, the controller being programmed with instructions for determining a selected supply flow rate based at least in part on a number of vehicle occupants, and for determining a selected recirculation flow rate based at least in part on (a) the selected supply flow rate, (b) the number of vehicle occupants, or (c) both (a) and (b).

3. The system of claim 1, further comprising at least one sensor operably coupled to the controller and positioned to sense a characteristic of at least one of the supply air and the air in the interior volume, wherein the controller is programmed with instructions for at least one of (a) determining a selected supply flow rate based at least in part on the sensed characteristic, (b) determining the recirculation flow rate based at least in part on the sensed characteristic, or (c) both (a) and (b).

4. The system of claim 1, further comprising at least one sensor operably coupled to the controller and positioned to sense a characteristic of at least one of the supply air and the air in the interior volume, wherein the controller is programmed with instructions for at least one of (a) determining a selected supply flow rate based at least in part on the sensed characteristic, (b) determining the recirculation flow rate based at least in part on the sensed characteristic, or (c) both (a) and (b), wherein the sensed characteristic includes a concentration of at least one of $O_2$, $O_3$, $CO_2$, a particulate contaminant, and a gaseous contaminant.

5. The system of claim 1, further comprising:
at least one sensor operably coupled to the controller and positioned to sense a characteristic of at least one of the supply air and the air in the interior volume, wherein the sensed characteristic includes a concentration of at least one of a chemical element and a biological element; and
a data link device configured to transmit information about the sensed characteristic to a remote data link station.

6. The system of claim 1 wherein the external air supply device includes a pressurizing apparatus configured to compress air from external to the aerospace vehicle and positioned to provide the compressed external air as supply air to the interior volume.

7. The system of claim 1, further comprising an input device operably coupled to the controller and configured to provide a value representing a number of vehicle occupants to the controller.

8. The system of claim 1, further comprising a data link device operably coupled to the controller, the data link device being configured to receive a value representing a number of vehicle occupants from a remote data link station and to provide a signal associated with the value to the controller.

9. The system of claim 1, further comprising a temperature control device positioned so that at least a portion of the air moved by the recirculation device passes through or proximate to the temperature control device, the temperature control device being configured to adjust the temperature of the air that passes through or proximate to the temperature control device.

10. A method for providing airflow in an aerospace vehicle, comprising:
selecting a recirculation flow rate for moving air positioned within an interior volume of the aerospace vehicle between a first portion of the interior volume and a second portion of the interior volume by reducing an intake of supply air entering the vehicle in response to an input to increase humidity in the interior volume;
determining a flow rate of a recirculation device that will provide at least approximately the selected recirculation flow rate;
activating the recirculation device to produce the determined flow rate; and
removing gas contaminants from recirculated air directed into the interior volume by directing the recirculated air through a gas contaminant filter.

11. The method of claim 10, further comprising passing a portion of the air moved by the recirculation device through or proximate to a temperature control device, the temperature control device being configured to adjust the temperature of the air that passes through or proximate to the temperature control device.

12. The method of claim 10, further comprising at least one of (1) determining a selected supply flow rate of supply air directed to the interior volume of the aerospace vehicle based at least in part on a number of vehicle occupants, and (2) determining the selected recirculation flow rate based at least in part on (a) the selected supply flow rate, (b) the number of vehicle occupants, or (c) both (a) and (b).

13. The system of claim 10, further comprising:
receiving a number of vehicle occupants via a data link signal; and
determining a selected supply flow rate based at least in part on a number of vehicle occupants.

14. The method of claim 10, further comprising at least one of (1) determining a selected supply flow rate to the interior volume of the aerospace vehicle and (2) commanding an external air supply device to provide the selected supply flow rate.

15. The method of claim 10, further comprising:
sensing a characteristic of at least one of supply air and the air in the interior volume; and
determining at least one of (1) a selected supply flow rate, based at least in part on the sensed characteristic, and (2) the recirculation flow rate, based at least in part on the sensed characteristic.

16. The system of claim 10, further comprising:
sensing a characteristic associated with at least one of supply air and the air in the interior volume; wherein the sensed characteristic includes at least one of a concentration of a chemical element and a biological element; and
transmitting information about the sensed characteristic to a remote data link station via a data link signal.

17. The aerospace vehicle system of claim 1, further comprising:
a sensor configured to sense a characteristic of a contaminant in the interior volume; and
a data link device operably coupled to the sensor, the data link device being configured to transmit information about the characteristic of the contaminant to a remote data link station.

18. The system of claim 17 wherein the controller is operably coupled to the sensor and to the data link device, the controller being programmed with instructions for determining what information to send to the remote data link station via the data link device.

19. The system of claim 1 wherein the contaminant includes at least one of a biological element or a chemical element.

20. The aerospace vehicle system of claim 1 wherein:

the controller is programmed with instructions for determining a selected supply flow rate based at least in part on a number of vehicle occupants; and wherein the system further comprises a data link device operably coupled to the controller and configured to receive a value corresponding to the number of vehicle occupants from remote data link station via a data link signal and to provide a signal representing the number of vehicle occupants to the controller.

* * * * *